United States Patent [19]

Mori et al.

[11] Patent Number: 5,510,168

[45] Date of Patent: Apr. 23, 1996

[54] MAGNETIC RECORDING MEDIUM AND MAGNETIC RECORDING METHOD

[75] Inventors: Takahiro Mori; Takashi Horiyama, both of Tokyo, Japan

[73] Assignee: Konica Corporation, Japan

[21] Appl. No.: 150,719

[22] Filed: Nov. 12, 1993

[30] Foreign Application Priority Data

Dec. 7, 1992 [JP] Japan .................................. 4-326821

[51] Int. Cl.⁶ ............................ G11B 5/66; G11B 15/60; B32B 3/10; B32B 5/16

[52] U.S. Cl. ......................... 428/141; 428/332; 428/337; 428/480; 428/473.5; 428/474.4; 428/684 B; 428/684 BM; 428/684 ST; 428/684 SL; 428/684 SG; 428/900; 360/128; 360/130.21; 360/130.22; 360/130.24

[58] Field of Search ...................... 428/684 ST, 684 SL, 428/684 SG, 900, 332, 141, 480, 473.5, 474.4, 337, 684 B, 684 BM; 360/128, 130.21, 130.22, 130.24

[56] References Cited

U.S. PATENT DOCUMENTS

| | | | |
|---|---|---|---|
| 4,614,687 | 9/1986 | Nishimatsu | 428/329 |
| 4,710,421 | 12/1987 | Ono | 428/213 |
| 4,720,412 | 1/1988 | Katoh | 428/141 |
| 4,780,353 | 10/1988 | Takahashi | 428/141 |
| 4,804,736 | 2/1989 | Utsumi | 528/176 |
| 5,051,282 | 9/1991 | Katoh | 428/141 |
| 5,196,265 | 3/1993 | Ryoke | 428/332 |
| 5,316,823 | 5/1994 | Etchu et al. | 428/141 |

Primary Examiner—Leszek Kiliman
Attorney, Agent, or Firm—Jordan B. Bierman; Bierman and Muserlian

[57] ABSTRACT

A magnetic recording medium comprises a support and provided thereon, a magnetic recording component layer which comprises an uppermost layer containing a ferromagnetic metal powder and a binder, a thickness of said magnetic recording component layer being from 0.2 to 3.0 μm, a thickness of the support being from 3.5 to 10.5 μm, an average center line roughness of the surface of the support on said magnetic recording component layer side being not more than 10 nm, and an average center line roughness of the surface of said uppermost magnetic layer being not more than 4 nm, wherein $E_T$ (in terms of kg/mm²), Young's modulus in the transverse direction of the support and $t_s$ (in terms of mm), a thickness of the support satisfy the following inequality:

$$E_T \geq 0.03/t_s^2$$

11 Claims, 3 Drawing Sheets

MAGNETIC RECORDING MEDIUM AND MAGNETIC RECORDING METHOD

FIELD OF THE INVENTION

The present invention relates to a magnetic recording medium, particularly to a magnetic recording medium having an improved head touch.

BACKGROUND OF THE INVENTION

In the recent years, a tape-shaped magnetic recording medium (hereinafter referred to as a tape) are required to be capable of being recorded in high density and providing high outputs. Concretely, it is required to improve magnetic layers of the medium, and make the tape thinner to be capable of recording for a long time, which includes making thinner a component layer comprising the magnetic layers and a non-magnetic support.

However, even if a high output is achieved by making improvements in magnetic layer, head touch failures are liable to occur and thereby the output is lowered as long as a thin non-magnetic support is used. Though a high-output capability is not easily compatible with decrease in tape thickness as mentioned above, many studies have so far been made to reconcile them. Particularly, enhancement of tape stiffness in transverse direction (hereinafter referred to as TD) is known as a useful means to prevent head touch failures and achieve high outputs in thin tapes, is studied in various manners.

For example, Japanese Ptent Publication open to Public Inspection (hereinafter referred to as Pat. O.P.I. Pub.) No. 146518/1992 proposes a magnetic recording medium having a total thickness of 11 μm or less and comprising a polyethylene terephthalate support having a TD Young's modulus of 700 kg/mm² or more and a machine direction (hereinafter referred to as MD) Young's modulus of 800 kg/mm² or less.

Japanese Pat. O.P.I. Pub. No. 146519/1992 proposes a magnetic recording medium having a TD stiffness/MD stiffness ratio of 0.65 to 1.00.

Further, Japanese Pat. O.P.I. Pub. No.271010/1992 proposes a magnetic recording medium having a total thickness of 11μm or less and comprising a polyethylene terephthalate support having a TD Young's modulus of 700 kg/mm² or more and an MD Young's modulus of 450 to 720 kg/mm².

The TD stiffness of a tape is expressed in $Et^3$ when the TD Young's modulus of a tape is shown by E and the tape thickness by t. Accordingly, when E is kept constant, the TD stiffness sharply decreases as the tape becomes thinner. However, the methods proposed so far specify only the TD and MD Young's moduli or the strength balance of TD/MD, and do not specify at all the relationship between these factors and the tape thickness.

With the increasing demand for recording of higher density and longer time, the tape thickness will be reduced to 6 μm or so in the near future. For that reason, there is demanded a technique to maintain a high outputting capability even in such a thin tape, or a technique to manufacture, without lowering the output, a tape with uniform magnetic layer structure even in a tape thickness of 6 to 13 μm.

SUMMARY OF THE INVENTION

Accordingly, an object of the invention is to provide a magnetic recording medium having an adequate head touch and a high outputting capability irrespective of its thickness.

The above object of the invention is achieved by a magnetic recording medium having at least one magnetic recording component layer formed on one side of a non-magnetic support, a magnetic layer constituting the uppermost layer and containing a ferromagnetic metal powder and a binder, and a back coating layer provided when necessary on the other side of the support, wherein the thickness of the magnetic recording component layer $t_r$ is 0.2 to 3.0 μm and the thickness of the non-magnetic support $t_s$ is 3.5 to 10.5 μm in the total thickness of the magnetic recording medium T, the TD Young's modulus $E_T$ (kg/mm²) of the non-magnetic support satisfies $E_T \geq 0.03/t_s^2$ ($t_s$ is in mm), the center line average roughness on the component layer side surface of the non-magnetic support $R_aS$ is 10 nm or less, and the center line average roughness on the surface of the component layer $R_aM$ is 4 nm or less.

In a preferred embodiment of the invention, the non-magnetic support is a polyethylene terephthalate film having a TD Young's modulus $E_T$ of 550 to less than 700 kg/mm², a polyethylene naphthalate film having a TD Young's modulus $E_T$ of 750 to 1500 kg/mm² or a aramid film having a TD Young's modulus $E_T$ of 1000 to 2500 kg/mm².

Further, the above object of the invention is achieved by a magnetic recording method which uses, in recording and playing back, the magnetic recording medium of the invention under the condition which satisfies the following relationship:

$$r \leq 500T$$

where r (mm) is a curvature radius of an arc formed by a projecting head of the section cut by a plane containing a head drum rotation axis and the center of a head gap of a magnetic recorder and facing a sliding magnetic recording medium, and T (mm) is a total thickens of the magnetic recording medium.

DETAILED DESCRIPTION OF THE INVENTION

Figure 1:
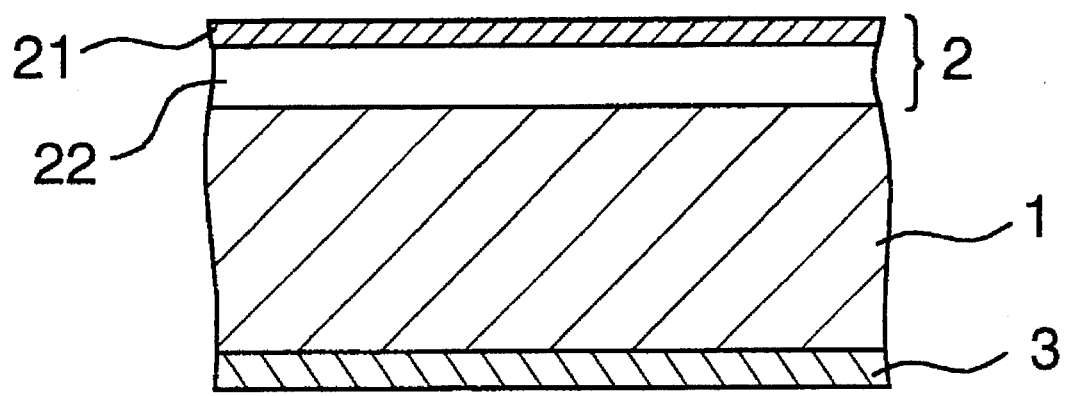
FIG. 1 is a cross-sectional view showing the magnetic recording tape of the invention.

As the result of a study conducted using a variety of polyethylene terephthalate (hereinafter referred to as PET) supports, polyethylene naphthalate (hereinafter referred to as PEN) supports and aramid (hereinafter referred to as PAD) supports different in MD and TD Young's moduli, as well as a study made for finding out an optimum magnetic head shape for tapes comprising these supports, it has proved that a magnetic recording medium having an adequate head touch and a high outputting capability can be obtained, irrespective of the tape thickness, by making the ratio of support's TD Young's modulus to support's thickness not less than a specific value, and that much better effects can be obtained by keeping the head shape suited to the tape thickness.

The TD stiffness of a tape is determined by the TD Young's moduli of a support and component layers including a magnetic layer as well as the thicknesses thereof. Among them, the magnetic layer usually contains a large amount of needle-like magnetic powder oriented in the longitudinal direction of the tape. And the degree of the orientation becomes higher with the increase in output of a tape. Accordingly, the strength of a magnetic layer is large in MD and small in TD; this tendency can be seen more apparently in tapes of higher outputs. Further, the thickness of component layers including a magnetic layer is smaller than that of a support. Therefore, the TD stiffness of a tape is virtually determined by the nature of a support, and improvement in support's TD Young's modulus becomes indispensable for the enhancement of tape stiffness.

However, when the TD stiffness of a tape expressed as $E_T t_s^3$ (where $E_T$ is a TD Young's modulus of a tape and $t_s$ is a total thickness of a support) is looked at, it is obvious that a 6-μm thick support needs, to be the same in stiffness, an $E_T$ about 10 times that of a 13-μm thick support or a Young's modulus too large to be achieved in a support. Hence it seems that the same output cannot be obtained in a thickness range of 13 μm to 6 μm without changing the structure of a magnetic layer. However, as the result of a study using PET, PEN and PAD supports different in MD and TD moduli and a study on the shape of a magnetic head suited to tapes using these supports, the present inventors have succeeded in obtaining nearly the same head touch and output over the support's thickness range of 13 μto 6 μm, without changing the structure of a magnetic layer, by setting $E_T t_s^2$ (where $E_T$ is a TD Young's modulus of a support and $t_s$ is a thickness of a support), or the TD strength of a support, to be not less than a specific value.

TD Young's modulus $E_T$ (kg/mm$^2$) necessary for a support is expressed as $$E_T \geq 0.03/t_s^2$$

where $t_s$ (mm) is a support thickness. The material of a support is not particularly limited as long as the above equation is satisfied. Further, since TD Young's modulus $E_T$ of a support achieved in the near future is regarded to be about 900 kg/mm$^2$ for PET, about 1500 kg/mm$^2$ for PEN and about 2500 kg/mm$^2$ for PAD, serviceable ranges of these materials can be determined by introducing these values as the upper limits of $E_T$ into the above equation.

However, the strength of PET is weaker than those of PEN and PAD; accordingly, MD Young's modulus $E_M$ of a PET support sharply decreases to 500 kg/mm$^2$ or less when TD Young's modulus $E_T$ is raised to 700 kg/mm$^2$ or more. A sharp drop in MD Young's modulus $E_M$ of a tape not only heavily lowers the running durability of a tape but increases the residual elongation due to the tension during manufacture or use of a tape and causes skewing.

Judging from the above facts, it is preferred that a PET support having an MD Young's modulus $E_M$ maintained at 500 kg/mm$^2$ or more and a TD Young's modulus $E_T$ enriched to 550 to less than 700 kg/mm$^2$ be used. Therefore, the applicable thickness of a PET support is limited up to about 6.5 μm; this necessitates improvements in a magnetic layer to maintain a high output using a PET support having a thickness of 6.5 μm or less.

PEN and PAD supports can maintain an adequate MD Young's modulus even if the TD Young's modulus is substantially raised and, therefore, these can be used as thin supports of 6.5 μm or less without making any improvement in a magnetic layer.

The study on the shape of a magnetic head was conducted, using a Sony Hi 8 Deck EV-S900 equipped with an unused head, by running a sample tape for 10 hours on the deck to wear the head to a shape optimum for the tape and measuring the shape of the head after it was stabilized. The measurement was made, using a WYKO light-interference type non-contact surface roughness meter, measuring the cross-sectional shape of the arc of a head's tip, which was on a plane containing the head rotation axis and the head gap center and projecting against a sample tape, approximating the measured shape to a circle passing through three points including both ends and a peak of the worn head, and determining a curvature radius r (mm) of the circle. The curvature radius of the unused head was processed to a very small dimension of about 1 mm. While a tape was run, r became larger, as the head was gradually worn, and the head was nearly stabilized in about 4 hours running and stabilized into a virtually fixed shape in 10 hours. Repetition of this wearing procedure with various tapes have proved that stabilized r is smaller as a tape becomes thinner. In the wearing procedure, TD Young's modulus $E_T$ of a support used in a sample tape did not exert a great influence, and r became nearly the same value for tapes having the same thickness. Further, when the curvature radius of a head was larger than that of a stabilized head for a tape, head touch failures occurred. Such head touch failures increased as the curvature radius became larger. On the contrary, use of a head having a curvature radius smaller than that of a stabilized head for a tape gave an adequate head touch and did not cause troubles in any other respects.

To bring out the feature of the magnetic recording medium of the invention more fully, it is required, judging from the above results, that the relationship between curvature radius r (mm) of the arc of a magnetic head projecting against a tape and the tape thickness T (mm) be $$r \leq 500T$$

and preferably $$r \leq 500(T-0.001).$$

In the embodiment of the invention, conventional techniques of magnetic recording media can be used as long as the above constituents of the invention are satisfied.

Next, the magnetic recording medium of the invention is described.

Non-magnetic Support

Materials suitable for the non-magnetic support include polyesters such as PET, PEN, polyolefins such as polypropylene, cellulose derivatives such as cellulose triacetate, cellulose diacetate, and other thermoplastic resins such as polyamide, PAD such as poly-p-phenylene terephthalamide (PPTA) and poly-p-benzamide (PBA), polycarbonate. Preferred are PET, PEN and PAD supports having TD Young's moduli of 550 to less than 700, 750 to 500 and 1000 to 2500 kg/mm$^2$ respectively The thickness of the non-magnetic support is in the range of 3.5 to 10.5 μm, and center line average roughness $R_a$ of the surface is 10 nm or less.

The non-magnetic support may be one subjected to surface treatment such as corona discharge.

For the purpose of improving running property, antistatic property of magnetic recording media and preventing transfer of a magnetic layer, a back coating layer may be provided on one side of a support where no magnetic layer is formed (reverse side); further, a subbing layer may be provided between the magnetic layer and the non-magnetic layer.

Magnetic Recording Component Layer

The total thickness of the component layers ranges from 0.2 to 3.0 μm. The uppermost layer of the component layers is a magnetic layer containing a ferromagnetic metal powder. The center line average roughness of its surface $R_a'0$ is 4 nm or less.

The ferromagnetic metal powder used in the uppermost magnetic layer includes ferromagnetic powders such as Fe type, Co type, Fe—Al type, Fe—Al—Ni type, Fe—Al—Zn type, Fe—Al—Co type, Fe—Al—Ca type, Fe—Ni type, Fe—Ni—Al type, Fe—Ni—Co type, Fe—Ni—Si—Al—Mn type, Fe—Ni—Si—Al—Zn type, Fe—Al—Si type, Fe—Ni—Zn type, Fe—Ni—Mn type, Fe—Ni—Si type, Fe—Mn—Zn type, Fe—Co—Ni—P type, Ni—Co type, and metal magnetic powders whose principal components are Fe, Ni and Co. Of them, Fe type metal powders are excellent in electrical properties.

When corrosion-resistance and dispersibility are taken into consideration, preferred are Fe—Al type metal powders including Fe—Al type, Fe—Al—Ca type, Fe—Al—Ni type, Fe—Al—Zn type, Fe—Al—Co type, Fe—Ni—Si—Al—Zn type and Fe—Ni—Si—Al—Mn type.

The ferromagnetic metal powders used in the invention comprise particles having an average major axial length of 0.5 μm or less, preferably 0.01 to 0.4 μm and more preferably 0.01 to 0.3 μm when measured with a transmission electron microscope, and their axial ratio (average major axial length/average minor axial length) is 12 or less, preferably 10 or less.

One preferred example of the ferromagnetic metal powders used in the invention is an Fe—type ferromagnetic metal powder, for example, one having an Fe:Al weight ratio of 100:5, an average major axial length of 0.16 μm, a coercive force (Hc) of 1780 Oe, and a saturation magnetization quantity ($\sigma_s$) of 120 emu/g.

Irrespective of being ferromagnetic metal powders having an average major axial length and an axial ratio within the ranges specified above or tabular ferromagnetic alloy powders having an axis of easy magnetization perpendicularly to particle face, it is usually preferred that their saturation magnetization quantity ($\sigma_s$), an essential magnetic property, be 70 emu/g or more. When the saturation magnetization quantity is less than 70 emu/g, the electromagnetic conversion property is liable to be lowered.

In the embodiment of the invention, ferromagnetic metal powders having a specific surface area of 45 $m^2/g$ or more by the BET method are advantageously used in high density recording.

When the magnetic layer is provided as a laminated layer, conventional ferromagnetic powders employed in magnetic recording media can be used as ferromagnetic powders. Examples thereof include oxide magnetic substances such as $\gamma$-$Fe_2O_3$, Co-containing $\gamma$-$Fe_2O_3$, Co-coated $\gamma$-$Fe_2O_3$ and $CrO_2$, and ferrites represented by magnetite, namely $Fe_3O_4$, Co-containing $Fe_3O_4$, Co-coated $Fe_3O_4$.

Among the above ferrites, tabular ones having an easy axis for magnetization perpendicularly to particle face can be employed as preferable ferromagnetic powders. Such ferromagnetic powders include, for example, hexagonal ferrites.

In the invention, there may be provided a non-magnetic layer, a high magnetic permeability layer and, if necessary, a conductive layer, as magnetic recording component layers other than the magnetic layer.

Suitable non-magnetic powders for a non-magnetic layer include, for example, carbon black, graphite, $TiO_3$, barium sulfate, ZnS, $MgCO_3$, $CaCO_3$, ZnO, CaO, tungsten disulfide, molybdenum disulfide, boron nitride, MgO, $SnO_2$, $SiO_2$, $Cr_2O_3$, $\alpha$-$Al_2O_3$, $\alpha$-$Fe_2O_3$, $\alpha$-FeOOH, SiC, cerium sulfide, corundum, artificial diamond, α-iron oxide, garnets, garnet, silica, silicon nitride, silicon carbide, molybdenum carbide, boron carbide, tungsten carbide, titanium carbide, tripoli, diatom earth, dolomite.

Among them, preferred are inorganic powders such as carbon black, $TiO_2$, barium sulfate, $\alpha$-$Al_2O_3$, $\alpha$-$Fe_2O_3$, $\alpha$-FeOOH, $Cr_2O_3$.

In the invention, non-magnetic powders comprising needle-like particles can be advantageously used. Using such needle-like non-magnetic powders improves the surface smoothness of the non-magnetic layer and, further, improves the surface smoothness of the magnetic layer laminated thereon as the uppermost layer.

The major axial length of the non-magnetic powder particles is usually 0.50 μm or less, preferably 0.40 μm or less and more preferably 0.30 μm or less.

In embodying the invention, it is preferred that the above non-magnetic powders be subjected to surface treatment using a Si-containing compound and/or an Al-containing compound. By use of such surface-treated non-magnetic powders, the surface condition of a magnetic layer constituting the uppermost layer can be improved. The content of the Si and/or Al is preferably 0.1 to 10% by weight of the non-magnetic powder for Si and 0.1 to 10 wt % for Al.

The content of non-magnetic powder in the non-magnetic layer is usually 50 to 99% preferably 60 to 95% and more preferably 70 to 95% by weight of the total components to form the non-magnetic layer. When the content is within the above range, the surface condition can be improved in the non-magnetic layer as well as in the magnetic layer which forms the uppermost layer.

Preferred high magnetic permeability materials are those of which coercive force Hc is within the range of $0 < Hc \leq 1.0 \times 10^4$ (A/m), preferably $0 < Hc \leq 5.0 \times 10^3$ (A/m). When the coercive force is within the above range, the uppermost layer's magnetization is effectively stabilized in its magnetization area. In contrast with this, when the coercive force is larger than that specified above, properties as a magnetic material are developed, making it difficult to provide desired properties.

In a preferred embodiment of the invention, high magnetic permeability materials are properly selected from those having a coercive force in the above range; such high magnetic permeability materials include metallic soft-magnetic materials and oxide soft-magnetic materials.

Examples of the metallic soft-magnetic materials include Fe—Si alloys, Fe—Al alloys (Alperm, Alfenol, Alfer), Permalloys (Ni—Fe type binary alloy and multi-component alloys obtained by adding Mo, Cu, Cr, etc. thereto), Sendust (Fe—Si—Al, composition: 9.6 wt % Si, 5.4 wt % Al and Fe as the balance) and Fe—Co alloys. Of them, Sendust is preferred. Usable metallic soft-magnetic materials are not limited to those illustrated above; other metallic soft-magnetic materials can also be employed as high magnetic permeability materials. These high magnetic permeability materials can be used singly or in combination of two or more kinds.

Examples of the oxide soft-magnetic materials include spinal type ferrites such as $MnFe_2O_4$, $Fe_3O_4$, $CoFe_2O_4$, $NiFe_2O_4$, $MgFe_2O_4$, $Li_{0.5}Fe_{2.5}O_4$, Mn—Zn type ferrites, Ni—Zn type ferrites, Ni—Cu type ferrites, Cu—Zn type ferrites, Mg—Zn type ferrites, Li—Zn type ferrites. Among them, Mn—Zn type ferrites and Ni—Zn type ferrites are preferred. These oxide soft-magnetic materials can be used singly or in combination.

These high magnetic permeability materials are pulverized with a ball mill or other pulverizing apparatus to a fine powder, of which particle size is 1 mμ to 1,000 mμ, preferably 1 mµ to 500 mµ. In order to obtain such a fine powder, when a metallic soft-magnetic material is used, a molten alloy is sprayed into a vacuum atmosphere. Oxide soft-magnetic materials can be finely pulverized by use of the glass crystallization method, coprecipitation firing method, hydrothermal synthesis method, flux method, alkoxide method or plasma jet method.

In a layer containing such a high magnetic permeability material, the content of the high magnetic permeability material is 10 to 100 wt %, preferably 50 to 100 wt % and more preferably 60 to 100 wt %. When the content of the high magnetic permeability material is within the range specified above, the magnetization in the uppermost layer is effectively stabilized. When the content is less than 50 wt %, the effect as a high magnetic permeability layer cannot be obtained in many cases.

This layer which contains the high magnetic permeability material may contain non-magnetic particles.

As non-magnetic powders to be added to the conductive layer, at least one selected from those illustrated below (these may be jointly used) is used in amounts of 10 to 80 wt % of the total weight of the conductive layer.

Examples of the non-magnetic powders include powders of tin oxide, tin-oxide-containing indium oxide, indium oxide, zinc oxide, silicon carbide, titanium oxide, barium oxide, molybdenum oxide or magnesium oxide. There can also be added as binders, in amounts of 10 to 90 wt %, conductive polymers such as π-conjugated conductive polymers (polypyrrole, polyaniline, poly-p-phenylene, polyphenylene vinylene, polythienylene, polythiophene, poly-2,5-pyridinediyl, polyisothianaphthene), Li-salt-containing polyvinyl alcohols, and Li-salt-containing polyethylene oxides.

Using the means described above, the surface specific resistance of the lower layer is made 109 Ω/sq or less.

By forming the magnetic recording component layers as described above, the conductivity of the component layers is enhanced and their antistatic property is improved; as a result, the number of dropouts is decreased and discharge noises are prevented.

Binders Used in the Invention

Typical binders used in the invention are polyurethanes, polyesters, and vinyl chloride type resins such as vinyl chloride copolymers. Preferably, these resins contain repeated units having at least one polar group selected from —$SO_3M$, —$OSO_3M$, —COOM and —$PO(OM^1)_2$.

In the above polar groups, M represents a hydrogen atom or an alkali metal atom such as Na, K or Li, $M^1$ represents a hydrogen atom, an alkali metal atom such as Na, K or Li, or an alkyl group.

These polar groups have a function to enhance dispersibility of ferromagnetic powders and are contained in the resin at a rate ranging from 0.1 to 8.0 mol %, preferably from 0.5 to 6.0 mol %. When the content is less than 0.1 mol %, the dispersibility of ferromagnetic powders is lowered. On the contrary, a content larger than 8.0 mol % causes a magnetic paint to gel. Meanwhile, the weight average molecular weight of the above resins is preferably in the range of 15,00 to 50,000.

These binders are used in the magnetic layer in amounts of usually 10 to 20 parts, preferably 15 to 30 parts per 100 parts by weight of ferromagnetic powder.

The binders can be used either singly or in combination of two or more kinds; when these are used in combination, the ratio of polyurethane and/or polyester to vinyl chloride type resin is within the range of usually 90:10 to 10:90, preferably 70:30 to 30:70 in weight ratio.

Besides the above resins, other resins of which weight average molecular weight ranges from 10,000 to 200,000 can also be used. Examples thereof include vinyl chloride-vinyl acetate copolymers, vinyl chloride-vinylidene chloride copolymers, vinyl chloride-acrylonitrile coplymers, butadien-acrylonitrile copolymers, polyamide resins, polyvinyl butyrals, cellulose derivatives including nitrocellulose, styrene-butadiene copolymers, phenolic resins, epoxy resins, phenoxy resins, silicone resins, acrylic resins, urea-formamide resins, and various resins of synthetic rubber type.

Other Ingredients

In embodying the invention, other ingredients such as durability improvers, dispersing agents, lubricants, abrasive materials, antistatic agents and fillers can be used to improve the properties of the magnetic layer.

Suitable durability improvers are polyisocyanates such as aromatic polyisocyanates including adducts of active-hydrogen-containing compounds with tolylene diisocyanate (TDI) and aliphatic polyisocyanates including adducts of active-hydrogen-containing compounds with hexamethylene diisocyanate (HMDI). The weight average molecular weight of these polyisocyanates is preferably in the range of 100 to 3,000.

Examples of the dispersing agents include fatty acids having 12 to 18 carbon atoms such as caprylic acid, capric acid, lauric acid, myristic acid, palmitic acid, stearic acid, oleic acid; alkali metal salts, alkali earth metal salts or amides of these fatty acids; alkyl phosphates of polyalkylene oxide; lecithin; trialkyl polyolefinoxy quaternary ammonium salts; and azo compounds having a carboxyl group or a sulfonic acid group. These dispersing agents are employed usually within the range of 0.5 to 5 wt % of ferromagnetic powder.

As the lubricants, fatty acids and/or fatty esters are used. When fatty acids are used, the addition amount is 0.2 to 10 wt %, preferably 0.5 to 5 wt % of ferromagnetic powder. An addition amount less than 0.2 wt % tends to lower the running property; an addition amount larger than 10 wt % is liable to cause bleeding of fatty acids and lowers the output. The addition amount of fatty esters is also 0.2 to 10 wt %, preferably 0.5 to 10 wt % of ferromagnetic powder. When the addition amount is less than 0.2 wt %, the still durability becomes poor; when it exceeds 10 wt %, fatty esters migrate to the surface of a magnetic layer, causing output drop. When a fatty acid and a fatty ester are jointly used to enhance the lubricating property much more, the ratio of fatty acid to fatty ester is preferably 10:90 to 90:10 by weight.

Further, as lubricants other than the above fatty acids and fatty esters, silicone oils, graphite, carbon fluoride, molybdenum disulfide, tungsten disulfide, fatty amides and α-olefin oxides can also be used.

Examples of the abrasive materials include α-alumina, molten alumina, chromium oxide, titanium oxide, α-iron oxide, silicon oxide, silicon nitride, tungsten carbide, molybdenum carbide, boron carbide, corundum, zinc oxide, cerium oxide, magnesium oxide, boron nitride. Preferred are those having an average particle size of 0.05 to 0.6 µm, especially preferred are those having an average particle size of 0.1 to 0.3 µm.

Antistatic agents usable in the invention are conductive powders such as carbon black and graphite; other usable ones include cationic surfactants such as quaternary ammonium salts, anionic surfactants having an acid group such as sulfonic acid, sulfuric acid, phosphoric acid, phosphate or carboxylic acid, amphoteric surfactants such as aminosulfonic acid, and natural surfactants such as saponins. These antistatic agents are usually employed in the range of 0.01 to 40 wt % of binder.

FIG. 1 is a cross-sectional view showing one example of the magnetic recording medium which meets the requirements of the invention, in which 1 shows a support, 2 component layers, 3 a back coating layer, 21 a magnetic layer and 22 a non-magnetic layer.

Manufacture of Magnetic Recording Medium

In kneading and dispersing components to form a magnetic layer, a variety of kneaders and dispersers can be used.

Suitable examples include two-roll mills, three-roll mills, ball mills, pebble mills, coball mills, Tron mills, sand mills, sand grinders, Sqegvari attritor, high-speed impeller dispersers, high-speed stone mills, high-speed impact mills, dispersers, high-speed mixers, homogenizers, supersonic dispersers, open kneaders, continuous kneaders, and pressure kneaders. Among these kneaders and dispersers, those which can provide a power consumption load of 0.05 to 0.5 KW (per Kg magnetic powder) are pressure kneaders, open kneaders, two-roll mills and three-roll mills.

Figure 2:
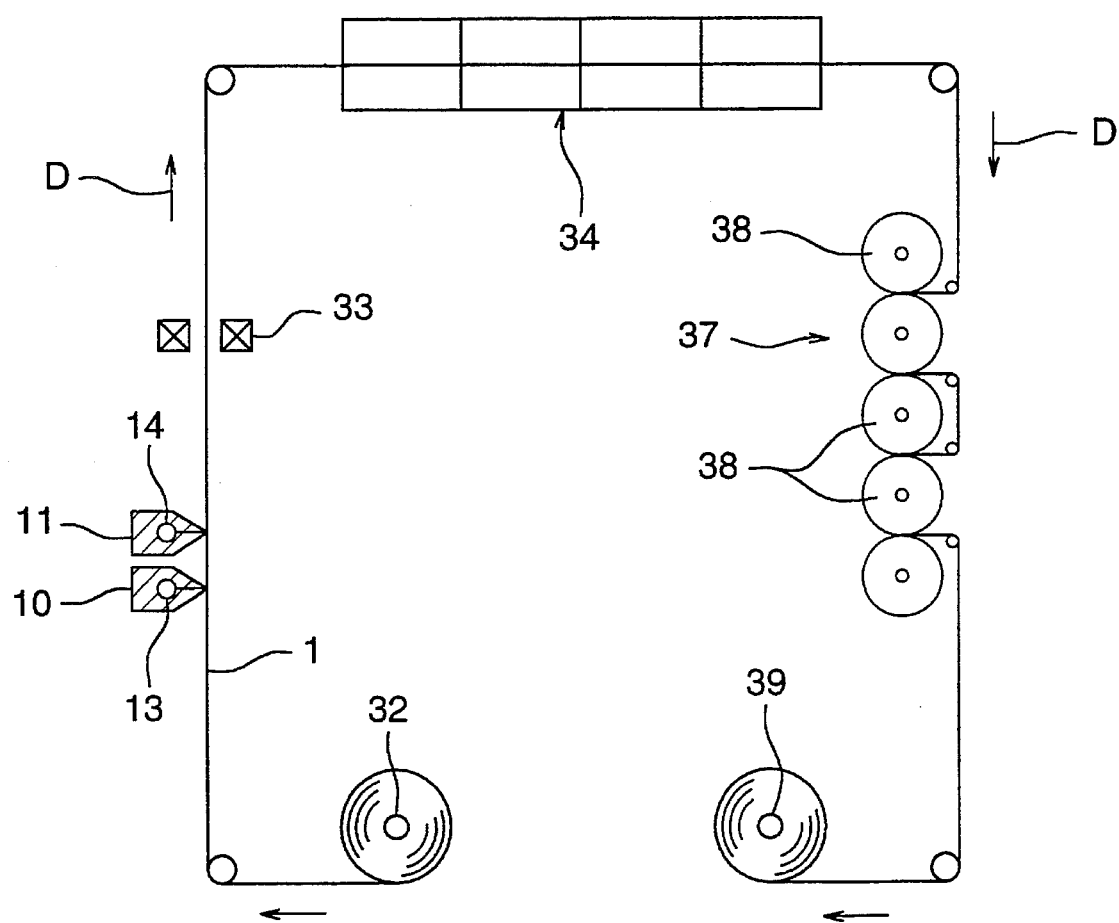
FIG. 2 is a schematic diagram showing double-layer coating of magnetic layers in wet-on-wet method.

Conventional coating methods can be used to form a magnetic layer and an intermediate layer on a non-magnetic support. To carry out double-layer coating, use of the extrusion method, particularly the wet-on-wet extrusion coating method, is preferred. This wet-on-wet coating is practiced, as shown in FIG. 2, by providing coating solutions for the respective component layers double-layeredly in wet-on-wet mode with extrusion coaters 10 and 11 on film support 1 delivered with feed roll 32, passing the coated 1 through orienting magnet or vertically orienting magnet 33, and introducing it into dryer 34 where it is dried with hot air blown from nozzles arranged up and down. Support 1 bearing dried layers is then led to supercalender 37 comprising calender rolls, calendered there, and wound on wind-up roll 39. The magnetic film so prepared is cut into tapes of desired widths to obtain, for example, 8-mm wide magnetic recording tapes for video camera.

In the above procedure, the coating solutions may be fed to extrusion coaters 10 and 11 through unillustrated in-line mixers. In FIG. 2, arrow D indicates the direction in which the non-magnetic base film is conveyed. Extrusion coaters 10 and 11 are provided with reservoirs 13 and 14, respectively, so that coating solutions from the two coaters are coated in wet-on-wet mode; that is, immediately after coating the coating solution for lower layer (while it is wet), the coating solution for upper layer is coated thereon.

Figure 3:
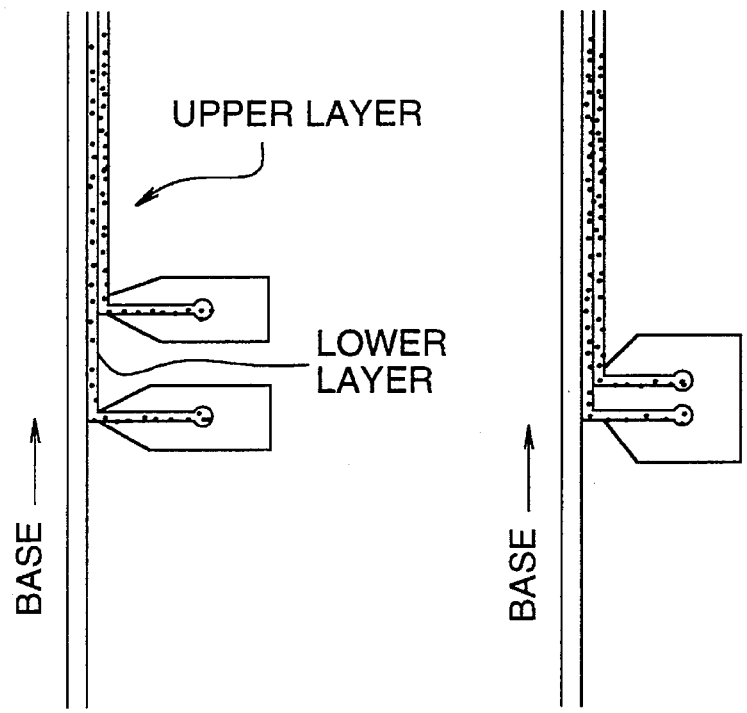
FIG. 3(a), 3(b) and 3(c) are cross-sectional views showing examples of extrusion coaters.
Figure 3:
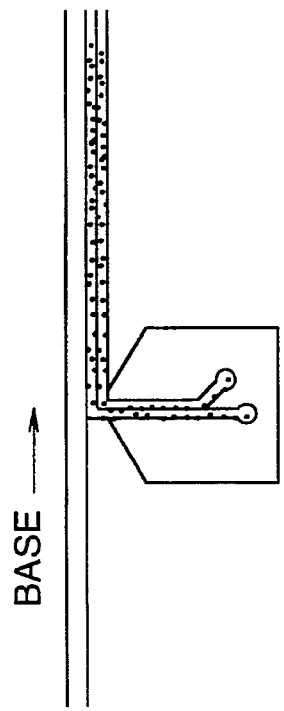

As the coater head, head (c) shown in FIG. 3 is advantageously used in the embodiment of the invention.

Solvents blended in the above paints or diluting solvents used at the coating of the paints are, for example, ketones such as acetone, methyl ethyl ketone, methyl isobutyl ketone, cyclohexanone; alcohols such as methanol, ethanol, propanol, butanol; esters such as methyl acetate, ethyl acetate, butyl acetate, ethyl lactate, ethylene glycol monoacetate; ethers such as glycol dimethyl ether, glycol monoethyl ether, dioxane, tetrahydrofuran; aromatic hydrocarbons such as benzene, toluene, xylene; and halogenated hydrocarbons such as methylene chloride, ethylene chloride, carbon tetrachloride, chloroform, dichlorobenzene. These solvents can be used singly or in combination of two or more kinds.

The magnetic field set up by the above orienting magnet or vertically orienting magnet is about 20 to about 5,000 gausses, the drying temperature in the dryer is about 30° to about 120° C., and the drying time is about 0.1 to about 10 minutes.

In the above double-layer coating carried out in wet-on-wet mode, the uppermost magnetic layer is coated while the layer located thereunder is wet. Therefore, the surface of the lower layer, or the interface with the uppermost layer, becomes smooth and, at the same time, the surface property of the uppermost layer is improved and, in addition, the adhesion between the upper and lower layers is enhanced. As the result, requirements for magnetic tapes, namely high outputs and low noises necessary for high density recording, are satisfied and, further, delamination is prevented, coating strength is improved, and thereby high durability is attained. Moreover, wet-on-wet double-layer coating brings about additional advantages such as decrease in dropouts and rise in reliability.

Surface Smoothing

Preferably, the magnetic recording medium of the invention is calendered for the improvement of surface smoothness.

In the invention, the surface roughness of the component layers or the uppermost magnetic layer is given by center line roughness $R_a$ measured by use of a feeler.

One preferred means to make the above $R_a$ 4 nm or less is to control properly the surface smoothness of the magnetic layer by setting the calendering conditions in the foregoing manufacturing process. That is, in the surface smoothing of the invention, factors which exert strong influences upon calendering conditions are temperature, linear pressure and line speed. Other influencing factors are the kneading conditions and surface treatment of magnetic powder as well as the size and amount of particles added to the magnetic layer.

Preferably, calendering is carried out under the conditions of temperature: 50° to 140° C., linear pressure: 50 to 400 kg/cm and line speed: 20 TO 600 m/min. Particularly preferred is use of a steel/steel calender which can provide a linear pressure higher than 1000 kg/cm.

After calendering, the magnetic film so obtained is burnished or bladed according to a specific requirement and then slitted into tapes.

EXAMPLES

The invention is hereunder described with examples in which the coating layer on the magnetic layer side is composed only of a 2.0 -µm thick single layer containing a magnetic metal powder, but the scope of the invention is by no means limited to them. Particularly, when the coating layer on the magnetic layer side is formed in double-layer structure by providing a 0.20 -µm thick upper layer using the same magnetic coating and a 1.80 -µm thick lower layer using a non-magnetic coating prepared by dispersing a needle-like hematite (DPN-250BX) in the same binder as that used in the magnetic coating, though both output and C/N are respectively raised by about 2 dB, overall properties are improved, and thereby the effect of the invention is maintained.

The following magnetic layer composition was thoroughly kneaded with a pressure kneader, followed by mixing and dispersing. The resultant magnetic coating was coated on a support as shown in Table 1 so as to give a dry thickness of 2.0 µm after calendering and dried in a drying oven of 80°C. while subjected to magnetic orientation using a 5000-G electromagnet. After calendering, a back coating solution of the following composition was coated to a dry thickness of 0.5 µm. The magnetic film so prepared was slitted into 8-mm wide tapes, and then loaded in a cassette to use as samples for evaluation.

All the components, amounts and procedures shown in the following example can be varied within the range not deviating from the scope of the invention. In the example, all "parts" are parts by weight.

The following magnetic composition was prepared.

| Magnetic Composition | |
|---|---|
| Fe—Al type magnetic metal powder (Fe:Al ratio in number of atoms: overall average = 100:4, surface layer = 50:50, BET value = 53 m²/g, Hc = 1760 Oe, average major axial length = 0.14 μm) | 100 parts |
| Vinyl chloride resin (MR110 made by Nippon Zeon Co., Ltd.) | 10 parts |
| Metal-sulfonate-containing polyurethane resin (UR8700 made by Toyobo Co., Ltd.) | 10 parts |
| α-Alumina | 8 parts |
| Stearic acid | 1 part |
| Butyl stearate | 1 part |
| Mixed solvent (mixture of methyl ethyl ketone, toluene and cyclohexanone in equal volumes) | X parts* |

*added in parts during kneading and dispersing

After kneading and dispersing the composition, 5 parts of polyisocyanate compound (Coronate L) was added thereto to make a magnetic coating solution.

| Back Coating | |
|---|---|
| Carbon black (RAVEN 1035) | 40 parts |
| Barium sulfate (average particle size: 300 nm) | 10 parts |
| Nitrocellulose | 25 parts |
| Polyurethane resin (N-2301 made by Nippon Polyurethane Ind. Co.) | 25 parts |
| Polyisocyanate compound (Coronate L made by Nippon Polyurethane Ind. Co.) | 10 parts |
| Cyclohexanone | 400 parts |
| Methyl ethyl ketone | 250 parts |
| Toluene | 250 parts |

Thus, magnetic tape samples shown in Table 1 were obtained.

In Table 1, center line average roughness $R_aS$, $R_aM$ were measured using a Talystep at a cut-off of 0.25 mm.

The following measurements were made using the samples. The results are shown in Table 2.

Measuring Items

Electromagnetic Characteristics

The output and C/N were measured at 7 MHz on a Sony EV-S900.

Measurement of r

In the measurement, each of the tapes specified in the second row of Table 2 was used as a reference tape for a head shape. That is, prior to the measurement, each reference tape was run for 10 hours using an unused head to stabilize the shape of the head, and then r was measured. Further, every time a sample tape was measured, the output and C/N of the reference tape were measured to ascertain that these values were kept unchanged.

TABLE 1

| | Material of Support | Thickness of Support [μm] | Young's Moduli Support | | Support: $R_aS$ [nm] | Magnetic Layer: $R_aM$ [nm] |
|---|---|---|---|---|---|---|
| | | | TD [kg/mm²] | MD [kg/mm²] | | |
| Example 1 | PET | 9.8 | 650 | 550 | 6.0 | 2.5 |
| Example 2 | PET | 7.5 | 650 | 550 | 6.0 | 2.5 |
| Example 3 | PEN | 8.5 | 800 | 700 | 7.0 | 2.7 |
| Example 4 | PEN | 6.0 | 1200 | 600 | 7.0 | 2.7 |
| Example 5 | PEN | 5.5 | 1200 | 600 | 7.0 | 2.7 |
| Example 6 | PPTA | 5.0 | 1300 | 1330 | 7.0 | 2.7 |
| Example 7 | PPTA | 4.0 | 1960 | 860 | 7.0 | 2.7 |
| Comp. Example (1) | PET | 9.8 | 450 | 750 | 6.0 | 2.5 |
| Comp. Example (2) | PET | 7.5 | 450 | 750 | 6.0 | 2.5 |
| Comp. Example (3) | PEN | 7.5 | 800 | 700 | 12.0 | 5.0 |
| Comp. Example (4) | PEN | 6.0 | 600 | 980 | 7.0 | 2.7 |
| Comp. Example (5) | PEN | 5.5 | 600 | 980 | 7.0 | 2.7 |
| Comp. Example (6) | PPTA | 5.0 | 860 | 1960 | 7.0 | 2.7 |
| Comp. Example (7) | PPTA | 4.0 | 1300 | 1330 | 7.0 | 2.7 |

TABLE 2

|  | Electrical Properties: Measuring Condition 1 Reference Tape: Example 7 R of Head: 2.7 mm | | Electrical Properties: measuring Condition 2 Reference Tape: Example 5 R of Head: 3.4 mm | | Electrical Properties: Measuring Condition 3 Reference Tape: Example 3 R of Head: 4.5 mm | | Electrical Properties: measuring Condition 4 Reference Tape: Example 1 R of Head: 5.7 mm | |
|---|---|---|---|---|---|---|---|---|
|  | Output [dB] | C/N [dB] | Output [dB] | C/N [dB] | Output [dB] | C/N [dB] | Output [dB] | C/N [dB] |
| Example 1 | 1.0 | 0.5 | 1.0 | 0.5 | 0.8 | 0.4 | 0.7 | 0.4 |
| Example 2 | 0.0 | 0.0 | 0.0 | 0.0 | −0.1 | −0.1 | −0.2 | −0.1 |
| Example 3 | 0.3 | 0.1 | 0.3 | 0.1 | 0.0 | 0.0 | −0.1 | −0.1 |
| Example 4 | 0.3 | 0.1 | 0.2 | 0.1 | 0.0 | 0.0 | −0.4 | −0.3 |
| Example 5 | 0.0 | 0.0 | 0.0 | 0.0 | −0.2 | −0.1 | −0.6 | −0.3 |
| Example 6 | −0.0 | 0.0 | −0.1 | 0.0 | −0.3 | −0.1 | −0.8 | −0.4 |
| Example 7 | −0.2 | −0.1 | −0.4 | −0.2 | −0.7 | −0.3 | −1.2 | −0.7 |
| Comp. Example (1) | 0.0 | 0.0 | 0.0 | 0.0 | 0.0 | 0.0 | 0.0 | 0.0 |
| Comp. Example (2) | −0.7 | −0.4 | −0.7 | −0.4 | −0.8 | −0.5 | −1.1 | −0.7 |
| Comp. Example (3) | −1.2 | −1.0 | −1.2 | −1.0 | −1.4 | −1.1 | −1.6 | −1.2 |
| Comp. Example (4) | −1.4 | −1.2 | −1.5 | −1.2 | −1.7 | −1.3 | −2.0 | −1.6 |
| Comp. Example (5) | −2.0 | −1.8 | −2.2 | −1.8 | −2.5 | −2.0 | −2.7 | −2.1 |
| Comp. Example (6) | −1.4 | −1.3 | −1.7 | −1.5 | −2.0 | −1.7 | −2.3 | −1.9 |
| Comp. Example (7) | −2.1 | −1.8 | −2.3 | −2.0 | −2.7 | −2.5 | −3.2 | −3.0 |

What is claimed is:

1. A magnetic recording tape adapted to record a signal while moving in a running direction, said tape comprising a support having provided on a first side thereof, at least one magnetic recording component layer, an uppermost layer containing a ferromagnetic metal powder and a binder, a thickness of said at least one magnetic recording component layer being 0.2 to 3.0 microns, a thickness of said support being 3.5 to 10.5 microns, an average center line roughness of a surface of said support on said first side being not more than 10 nm, and an average center line roughness of a surface of said uppermost magnetic layer being not more than 4 nm, wherein a thickness of said support satisfies the following inequality:

$$E_T \geq 0.03/t_s^2$$

in which $E_T$ is a Young's modulus of said support in a transverse direction perpendicular to said running direction, in kg/mm$^2$, and $t_s$ is a thickness of said support in mm.

2. The tape of claim 1, wherein said support is a polyethyleneterephthalate, $E_T$ of which is 550 to less than 700 kg/mm$^2$.

3. The tape of claim 1, wherein said support is a polyethylenenaphthalate, $E_T$ of which is 750 to 1500 kg/mm$^2$.

4. The tape of claim 1, wherein said support is aramid, $E_T$ of which is 1000 to 2500 kg/mm$^2$.

5. The tape of claim 1, wherein said ferromagnetic metal powder is Fe-containing metal powder.

6. The tape of claim 1, wherein said ferromagnetic metal powder is Fe-Al-containing metal powder.

7. The tape of claim 4, wherein said aramid is poly-p-phenyleneterephthalamide or poly-p-benzamide.

8. A method of recording, comprising recording a signal on a magnetic recording tape moving through a magnetic recording apparatus in a running direction, said apparatus comprising a head drum and provided thereon, a head having a head gap, wherein said head and said magnetic recording tape satisfy the following inequality:

$$r \leq 500T,$$

in which r is a radius of curvature of an arc formed by a head surface of a section cut by a plane through a center of said head gap and a rotation axis of said head drum in mm, and T is a thickness of said magnetic recording tape in mm, said magnetic recording tape comprising a support having provided on a first side thereof, at least one magnetic recording component layer, an uppermost layer containing a ferromagnetic metal powder and a binder, a thickness of said at least one magnetic recording component layer being from 0.2 to 3.0 microns, a thickness of said support being 3.5 to 10.5 microns, an average center line roughness of a surface of said support on said first side being not more than 10 nm, and an average center line roughness of a surface of said uppermost magnetic layer being not more than 4 nm, wherein a thickness of said support satisfies the following inequality:

$$E_T \geq 0.03/t_s^2$$

in which $E_T$ is a Young's modulus of said support in a transverse direction perpendicular to said running direction in kg/mm$^2$, and $t_s$ is a thickness of said support in mm.

9. The method of claim 8, wherein said non-magnetic support is a polyethyleneterephthalate, $E_T$ of which is 550 to less than 700 kg/mm$^2$.

10. The method of claim 8, wherein said non-magnetic support is a polyethylenenaphthalate, $E_T$ of which is 750 to 1500 kg/mm$^2$.

11. The method of claim 8, wherein said non-magnetic support is aramid, $E_T$ of which is 1000 to 2500 kg/mm$^2$.

* * * * *